UNITED STATES PATENT OFFICE.

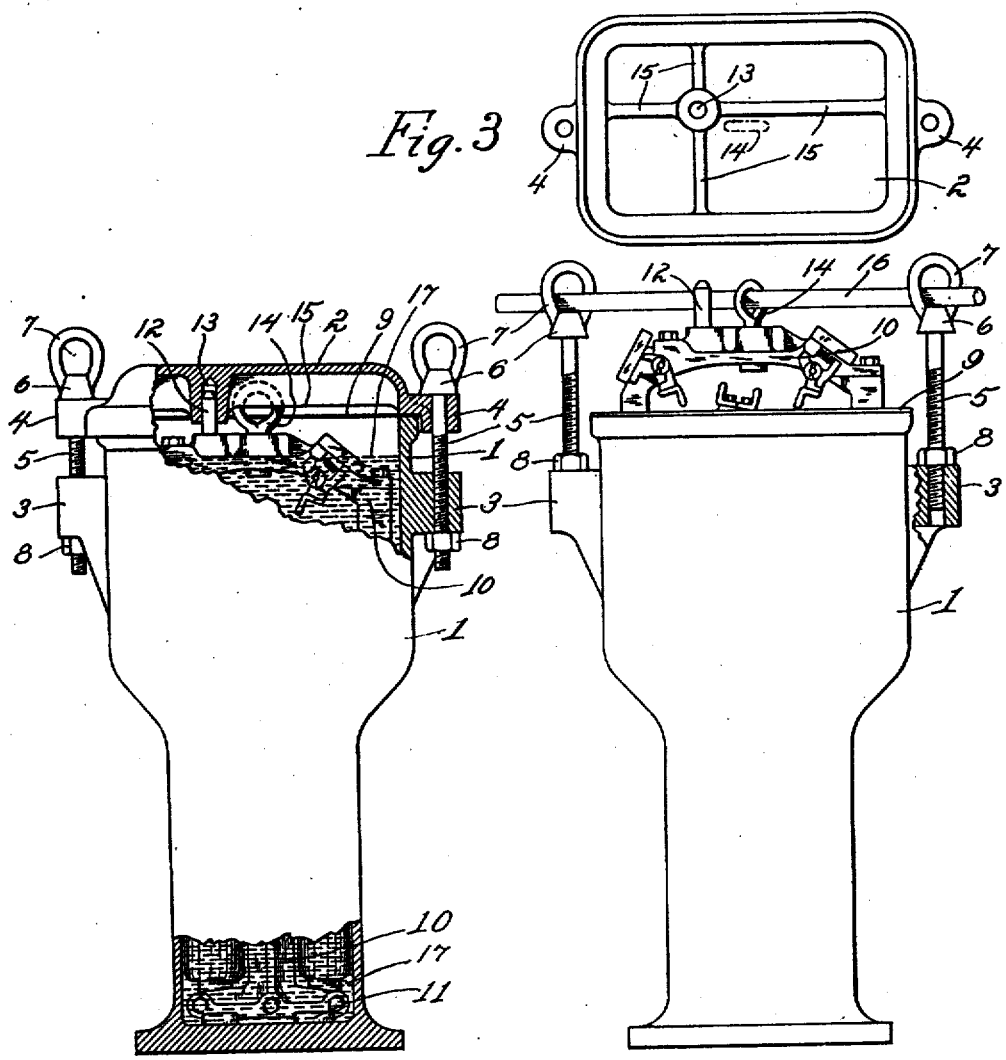

HARRY F. STRATTON, OF CLEVELAND, OHIO, ASSIGNOR TO THE ELECTRIC CONTROLLER & MANUFACTURING COMPANY, OF CLEVELAND, OHIO, A CORPORATION OF OHIO.

APPARATUS-CONTAINER.

1,326,882. Specification of Letters Patent. Patented Dec. 30, 1919.

Application filed May 3, 1917. Serial No. 166,185.

*To all whom it may concern:*

Be it known that I, HARRY F. STRATTON, a citizen of the United States, residing at Cleveland, in the county of Cuyahoga and State of Ohio, have invented new and useful Improvements in Apparatus-Containers, of which the following is a specification.

This invention relates to containers for electrical apparatus or the like.

One of the objects of this invention is to provide a casing with a cover and a set of eye-bolts, ring-bolts or the like, adapted to the following uses: to clamp the cover on the casing; to serve as lifting rings by which the casing and its contents may be lifted and transported; and to serve as screw-jacks for elevating the contents within the casing for inspection purposes when the cover has been removed. Another object is to provide a ring or other lifting means for the apparatus contained in the casing, by which it may be elevated within the casing or lifted entirely therefrom, and to provide a centering pin by which the apparatus may be centrally positioned within the casing, the lifting ring being correlated with a recess in the cover of the casing and the centering pin coöperating with a centering hole in the cover when the cover is in position on the casing. Other objects will be disclosed hereinafter.

Referring to the accompanying drawing, Figure 1 is a view, partly in section and partly in elevation, illustrating a container embodying my invention and showing an apparatus immersed in oil therein; Fig. 2, a view similar to Fig. 1, but with the cover removed, and with the apparatus jacked up within the container for inspection purposes; and Fig. 3, a bottom view of the cover.

On the drawing, 1 is a preferably metal casing provided with the top closure or cover 2. The opposite sides of the casing have the horizontal lugs 3 and the cover has the corresponding lugs 4 adapted to be arranged directly over the lugs 3. Each pair of lugs 3 and 4 has vertically alined holes to receive a threaded bolt 5 having the head 6 and the ring or eye 7. The heads of the bolts rest on the upper faces of the lugs 4 and the nuts 8 are screwed on the lower ends of the bolts and against the lower faces of the lugs 3 to clamp the cover tightly on the casing. The packing ring or gasket 9 may be interposed between the cover and the top of the casing.

10 represents the aforesaid apparatus which may be supported in any suitable manner in the casing; for example, it may rest on the bottom of the casing, as shown at 11. I provide the upper end of the apparatus with the centering pin 12, and the cover with the corresponding centering hole 13. When the cover is applied to the casing as shown on Fig. 1, the centering pin is in the said hole 13 and maintains the apparatus in a central position in the casing and out of contact with the sides thereof. The casing may contain a liquid, as oil, as shown at 17.

With the apparatus and casing assembled as in Fig. 1, the whole container may be lifted and transported by means of the rings 7. In order that the apparatus may be lifted out of the container or lowered into it when the cover has been removed, I provide the apparatus with the ring 14, which ring may be rigidly or rotatively connected to the apparatus. It is desirable that the ring 14 shall stand above the level of the casing 1 to facilitate its engagement with a suitable device for lifting the apparatus out of the tank. To accommodate the ring within the cover, I so locate the interior ribs 15 of the cover with respect to the ring that the ring may lie in one of the recesses formed by the ribs 15 and the outer wall of the cover, as shown in Fig. 1. A bottom plan view of the cover, disclosing the relative positions of the hole 13, the ribs 15 and the ring 14 is shown in Fig. 3, the position of the ring being indicated by broken lines.

When it is desired to elevate the apparatus within the casing in order to inspect its upper portions, the cover 2 is first removed by unscrewing the nuts 8 and taking out the bolts 5. The nuts are then screwed on the bolts, and the threaded ends of the bolts are then inserted into the lugs 3, the nuts resting upon the lugs 3, and the screws being turned down in the nuts so that the ring 14 is in line with the rings 7. A rod, or bar 16, is then passed through the two rings 7 and the ring 14. By screwing the nuts 8 toward the free ends of the bolts 5, the bolts rise, and by means of the bar 16 and the ring 14 elevate the apparatus 10 within the casing, as shown in Fig. 2. The bolts 5 and the nuts 8, in connection with the lugs 3, thus operate as screw-jacks.

My invention is not limited to the exact arrangement of parts shown, since many changes may be made therein without departing from the spirit of my invention; for example, the pin 12 may be located on the cover and the receptacle 13 on the apparatus.

I claim—

1. The combination with a casing and an apparatus therein, a cover for the casing, a power device adapted to secure the cover to the casing, and means coöperating with the power device for lifting the apparatus while in the casing.

2. The combination of a casing, an apparatus in the casing, threaded devices supported externally by the casing, and means coöperating with the threaded devices and connectible with the apparatus, for lifting the apparatus while in the casing.

3. In combination with a casing and an apparatus therein, means including a threaded means supported by the casing whereby the apparatus may be lifted relatively to the casing, and means whereby the casing and apparatus may be lifted together by the threaded means.

4. In combination with a casing and an apparatus therein, a pair of lugs on the casing, each lug having an opening, a threaded bolt for each opening, means for connecting the bolts to the apparatus, and means for causing the bolts to travel and lift the apparatus relatively to the casing.

5. In combination with a casing and an apparatus therein, a cover for the casing, operable means adapted to be moved relatively to the casing for lifting the apparatus relatively to the casing, a part of the said means being adapted to engage the casing whereby the casing and the apparatus may be lifted together, and engagement means on the apparatus adapted to be operatively connected with the operable means, there being a recess in the cover for the engagement means.

6. In combination with a casing and an apparatus therein, a cover for the casing, operable means for fastening the cover on the casing and means coöperating with the operable means and adapted to be moved relatively to the casing for lifting the apparatus relatively to the casing, and engagement means on the apparatus adapted to be operatively connected with the said operable means, there being a recess in the cover for the engagement means.

7. In combination with a casing and an apparatus therein, a cover for the casing, means for fastening the cover on the casing in a predetermined position, a centering pin and a receptacle therefor carried by the apparatus and the cover for predetermining the said position, and means coöperating with the fastening means and adapted to be moved relatively to the casing for lifting the apparatus relatively to the casing.

8. In combination with a casing and an apparatus therein, a cover for the casing, bolt and nut means for fastening the cover on the casing in a predetermined position, a centering pin and a receptacle therefor carried by the apparatus and cover for predetermining said position, and means coöperating with the bolt means and adapted to be moved relatively to the casing and supportingly engageable with the apparatus for lifting the apparatus relatively to the casing.

9. The combination of a casing, an apparatus therein, a cover for the casing, means for fastening the cover on the casing, means coöperating with the fastening means whereby the apparatus may be lifted in the casing, and a centering pin and a receptacle therefor carried by the cover and apparatus.

Signed at Cleveland, Ohio, this 30th day of April, 1917.

HARRY F. STRATTON.